United States Patent
Nishihara et al.

(10) Patent No.: US 9,735,880 B2
(45) Date of Patent: Aug. 15, 2017

(54) TRANSMISSION DEVICE, TRANSMITTER, AND TRANSMISSION METHOD

(71) Applicant: FUJITSU LIMITED, Kawasaki-shi, Kanagawa (JP)

(72) Inventors: Masato Nishihara, Kawasaki (JP); Toshiki Tanaka, Setagaya (JP); Tomoo Takahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/973,133

(22) Filed: Dec. 17, 2015

(65) Prior Publication Data
US 2016/0204869 A1    Jul. 14, 2016

(30) Foreign Application Priority Data
Jan. 8, 2015    (JP) ................. 2015-002540

(51) Int. Cl.
*H04B 10/516*    (2013.01)
*H04L 27/26*    (2006.01)
*H04B 10/2575*    (2013.01)
*H04B 10/077*    (2013.01)

(52) U.S. Cl.
CPC ....... *H04B 10/516* (2013.01); *H04B 10/0779* (2013.01); *H04B 10/25752* (2013.01); *H04L 27/2601* (2013.01)

(58) Field of Classification Search
CPC ............ H04B 10/516; H04B 10/25752; H04B 10/0779; H04L 27/2601
See application file for complete search history.

(56) References Cited

FOREIGN PATENT DOCUMENTS

JP    2004-112781    4/2004

*Primary Examiner* — Leslie Pascal
(74) *Attorney, Agent, or Firm* — Fujitsu Patent Center

(57) ABSTRACT

An optical transmitter includes a DMT modulating unit that allocates information signals to SCs and that generates a DMT signal by performing multi-level modulation on each of the information signals allocated to each of the SCs. The optical transmitter includes a mixer that shifts, on the basis of the probe result of the DMT signal and frequency information on a wireless signal that is input, the carrier frequency of the wireless signal so as not to overlap the SC to which the information signal in the DMT signal is allocated. Furthermore, the optical transmitter includes a multiplexing unit that multiplexes the DMT signal received from the DMT modulating unit and the wireless signal in which the carrier frequency has been shifted and outputs the multiplexed signal.

8 Claims, 12 Drawing Sheets

| SIGNALING TECHNIQUE | | CARRIER FREQUENCY fc | USE BAND WIDTH Δf |
|---|---|---|---|
| W-CDMA | | 0.8 GHz | 4.2 MHz |
| LTE | A COMPANY | 2.1 GHz | 10 MHz |
| | B COMPANY | 2.12 GHz | 10 MHz |
| | C COMPANY | 2.14 GHz | 10 MHz |
| WiMAX | | 2.5 GHz | 10 MHz |
| W-LAN | | 5 GHz | 10 MHz |
| NULL | | – | – |

| SC NUMBER | USE FREQUENCY | ALLOCATION SIGNAL |
|---|---|---|
| 1 | 0.02 GHz | DMT |
| 2 | 0.04 GHz | DMT |
| ... | ... | ... |
| N1 | GHz | WIRELESS |
| N | GHz | WIRELESS |
| N2 | GHz | WIRELESS |
| ... | ... | ... |
| M | XXX GHz | DMT |

TRANSMISSION DEVICE, TRANSMITTER, AND TRANSMISSION METHOD

CROSS-REFERENCE TO RELATED APPLICATION

This application is based upon and claims the benefit of priority of the prior Japanese Patent Application No. 2015-002540, filed on Jan. 8, 2015, the entire contents of which are incorporated herein by reference.

FIELD

The embodiments discussed herein are related to a transmission device, a transmitter, and a transmission method.

BACKGROUND

In recent years, for example, communication traffic of wireless signals of mobile terminals is increased in accordance with an increase in mobile terminals, such as smartphones. Accordingly, by using optical networks, for example, large capacity optical transmission of wireless signals of mobile terminals performed among base stations is desired.

Furthermore, in a transmission technique for optical networks, for example, a multicarrier modulation technique, such as a discrete multi-tone (DMT) modulation technique or the like, is known. The DMT modulation technique is one of multicarrier transmission technologies based on the orthogonal frequency division multiplexing (OFDM) technology. The DMT modulation technique is a technology that allocates information signals to subcarriers (SCs) with different frequencies, performs multi-level modulation on the information signals allocated to the SCs, and transmits the information signals as DMT signals at a high speed.

Furthermore, for transmission devices in optical networks, there is a known method of multiplexing the frequencies of DMT signals into wireless signals of mobile terminals. A transmission device performs frequency multiplexing on wireless signals into DMT signals, performs electrical to optical conversion on the DMT signals obtained by performing the frequency multiplexing on the wireless signals, and transmits optical DMT signals to a transmission device on an opposite side via an optical network. At this time, the DMT signals use, for example, the frequency band of several GHz to about 25 GHz, whereas the wireless signals use, for example, the frequency band of about 700 MHz to about 6 GHz. The transmission device on the opposite side separates the information signals and the wireless signals from the optical DMT signals received from the optical network. Consequently, the transmission device on the opposite side can acquire the information signals and the wireless signals from the optical DMT signals.

Patent Document 1: Japanese Laid-open Patent Publication No. 2004-112781

FIG. 15A and FIG. 15B are a schematic diagram illustrating an example of the number of bits to be allocated for each SC (frequency) in a DMT signal. FIG. 15A is a schematic diagram illustrating an example of the number of bits to be allocated for each SC in a DMT signal in which a wireless signal is not multiplexed. FIG. 15B is a schematic diagram illustrating an example of the number of bits to be allocated for each SC in a DMT signal in which a wireless signal is multiplexed. Furthermore, FIG. 15A and FIG. 15B illustrate the result of the experiment obtained when transmitting, by using an optical transmission line with the length of 10 km, an optical DMT signal obtained by multiplexing the wireless signal of 2 GHz bandwidth into the DMT signal of 100 Giga Bit Ethernet (GbE (registered trademark)).

In the optical DMT signal indicated in FIG. 15A, from among a plurality of SCs in the DMT signal, the transmission characteristic of the SCs on the low frequency side is favorable and the transmission characteristic of the SCs on the high frequency side is gradually degraded. Furthermore, for the DMT signal indicated in FIG. 15A, because the wireless signal of the low frequency band is not subjected to frequency multiplexing, the transmission characteristic thereof is favorable. At this time, the transmission rate is 113 bit per second (Gbps) and the bit error rate (BER) of $6.57 \times 10^{-4}$ is also obtained as the result of the experiment.

In contrast, in the optical DMT signal indicated in FIG. 15B, because the SCs on the low frequency side in which the transmission characteristic thereof is favorable overlap the wireless signal, the transmission characteristic thereof is remarkably decreased. At this time, the transmission rate is 109 Gbps and the BER of $8.32 \times 10^{-4}$ is also obtained as the result of the experiment.

Namely, for a transmission device, when frequency multiplexing (multiplexing) is performed on a wireless signal into a DMT signal, because the carrier frequency of the wireless signal overlaps the SCs on the low frequency side in the DMT signal, in which the transmission characteristic is favorable, the transmission characteristic of the DMT signal is decreased.

SUMMARY

According to an aspect of an embodiment, a transmission device includes a modulating unit, a shifting unit and an output unit. The modulating unit allocates information signals to a plurality of subcarriers and generates a first signal by modulating each of the information signals allocated to each of the subcarriers. The shifting unit shifts, on the basis of transmission characteristic information on the first signal and frequency information on a second signal that is input, the carrier frequency of the second signal so as not to overlap the subcarriers to which the information signals in the first signal are allocated. The output unit multiplexes the first signal and the second signal shifted by the shifting unit and outputs the multiplexed signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited to these embodiments.

[a] First Embodiment

Figure 1:
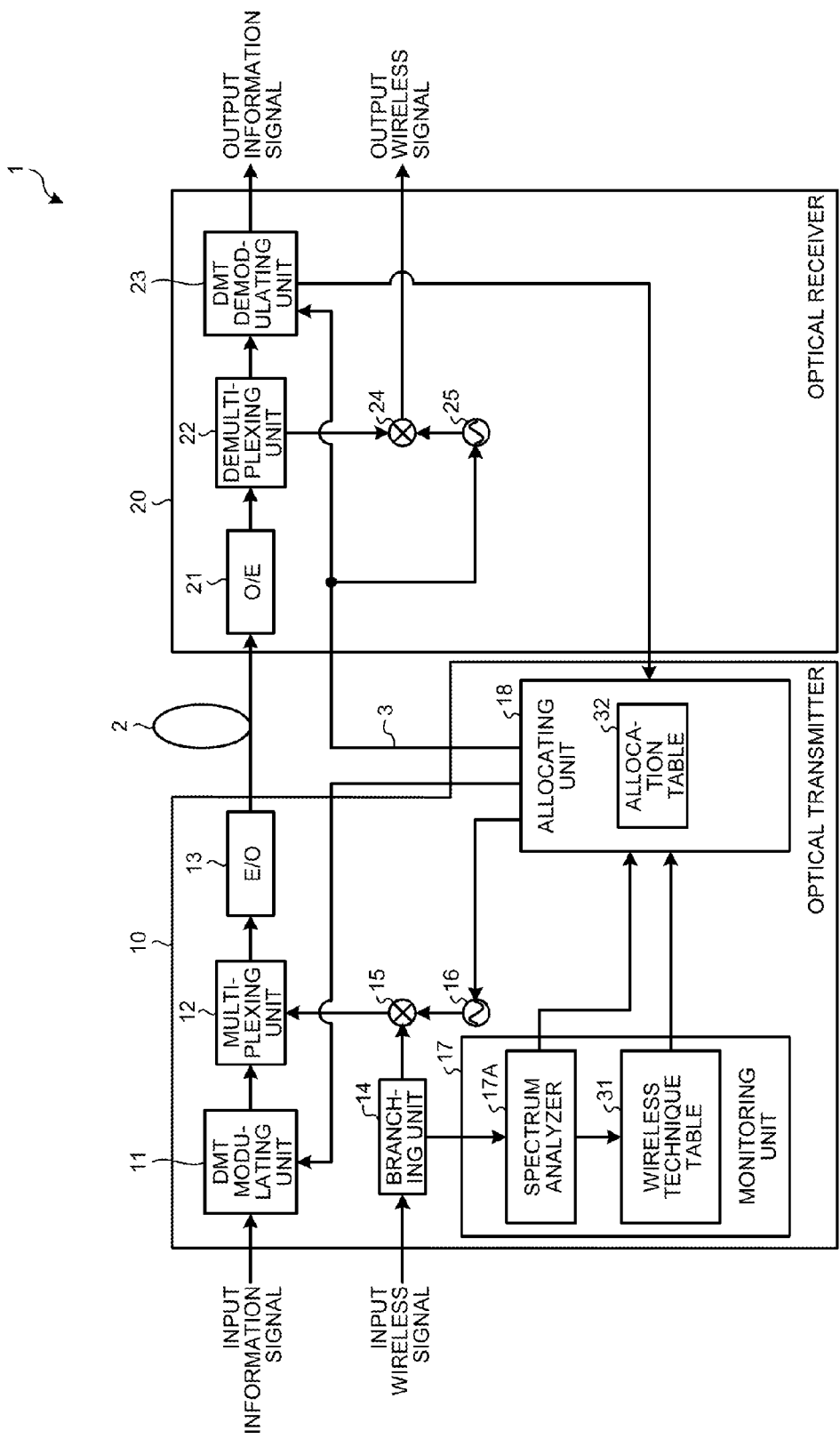
FIG. 1 is a block diagram illustrating an example of an optical transmission system according to a first embodiment.

FIG. 1 is a block diagram illustrating an example of an optical transmission system according to a first embodiment. An optical transmission system 1 illustrated in FIG. 1 includes an optical transmitter 10, an optical receiver 20, and an optical transmission line 2 that connects between the optical transmitter 10 and the optical receiver 20. The optical transmitter 10 is, for example, a transmission device, such as an optical module or the like, that is connected to optical access network in which mobile terminals are connected to base stations that accommodate the mobile terminals. The mobile terminals mentioned here are, for example, wireless terminals, such as, mobile phones, smartphones, tablet terminals, or the like. The optical receiver 20 mentioned here is, for example, a transmission device, such as an optical module or the like, that is accommodated in an optical metro network, an optical core network, or the like.

The optical transmitter 10 includes a DMT modulating unit 11, a multiplexing unit 12, an electrical to optical conversion unit (hereinafter, simply referred to as an E/O) 13, a branching unit 14, a mixer 15, an oscillator 16, a monitoring unit 17, and an allocating unit 18. The DMT modulating unit 11 is, for example, a modulating unit that allocates information signals to subcarriers (hereinafter, simply referred to as SCs) in channels having different frequencies, performs multi-level modulation on the information signal allocated for each SC, and generates a DMT signal. The branching unit 14 inputs, for example, a wireless signal of each of the mobile terminals from a base station and inputs, to the mixer 15 and the monitoring unit 17, each of the input wireless signals. The mixer 15 performs frequency conversion on the wireless signal received from the branching unit 14 in accordance with the oscillating frequency from the oscillator 16 and shifts the carrier frequency of the wireless signal. Furthermore, the mixer 15 inputs the shifted wireless signal to the multiplexing unit 12. The multiplexing unit 12 multiplexes the wireless signal received from the mixer 15 into the DMT signal received from the DMT modulating unit 11. The E/O 13 performs electrical to optical conversion on the DMT signal that is obtained by multiplexing the wireless signal and then outputs the optical DMT signal to the optical transmission line 2 for transmission. Furthermore, the multiplexing unit 12 and the E/O 13 correspond to, for example, an output unit.

Figure 2:
FIG. 2 is a schematic diagram illustrating an example of a wireless technique table.

The monitoring unit 17 includes a spectrum analyzer 17A and a wireless technique table 31. The spectrum analyzer 17A analyzes the frequency spectrum of the wireless signal received from the branching unit 14 and acquires, for example, a peak frequency from the result of the subject analysis. Furthermore, the monitoring unit 17 refers to the wireless technique table 31 on the basis of the analysis result of the wireless signal and acquires the frequency information, such as a wireless technique or the like of the wireless signal, that was input by the branching unit 14. FIG. 2 is a schematic diagram illustrating an example of the wireless technique table 31. The wireless technique table 31 illustrated in FIG. 2 manages, in an associated manner for each of a signaling technique 31A of a wireless signal, a carrier frequency 31B and a use band width 31C. The signaling technique 31A is a signaling technique for a wireless signal and is, for example, a signaling technique, such as wideband code division multiple access (W-CDMA) or long term evolution (LTE, registered trademark, the same also applies to the description below), WiMAX (registered trademark), or the like. Furthermore, even in the same signaling technique, management is individually performed for multiple telecommunications carriers. The carrier frequency 31B is a carrier frequency used by a signaling technique. The use band width 31C is the frequency band used in the signaling technique. The monitoring unit 17 refers to the wireless technique table 31 and acquires the frequency information, such as the signaling technique 31A, the carrier frequency 31B, and the use band width 31C of the wireless signal, that is associated with the peak frequency of the wireless signal.

Figure 3:
FIG. 3 is a schematic diagram illustrating an example of an allocation table.

The allocating unit 18 determines, on the basis of the carrier frequency and the use band width associated with the signaling technique for the wireless signal obtained from the monitoring unit 17, the SCs to be allocated to the wireless signal and the information signal from among a plurality of SCs in the DMT signal. The allocating unit 18 includes an allocation table 32. FIG. 3 is a schematic diagram illustrating an example of the allocation table 32. The allocation table 32 illustrated in FIG. 3 manages, in an associated manner for each of an SC number 32A, a use frequency 32B and an allocation signal 32C. The SC number 32A is an identification number for identifying an SC. The use frequency 32B is the frequency of the SC that is used for each of the SC number 32A. The allocation signal 32C is the signal type, such as "wireless" of a wireless signal or "DMT" of an information signal, that is allocated to the SC with the SC number 32A.

The allocating unit 18 acquires, from the monitoring unit 17, the error vector magnitude (target EVM) that is associated with the wireless technique for the wireless signal. Furthermore, the target EVM is, for example, a recommended evaluation value of a wireless signal that is recommended by telecommunications carriers. The allocating unit 18 calculates a signal to noise ratio (SNR) of a wireless signal by using the formula of SNR (dB)=−[PAPR+20×log$_{10}$ (EVM (%))]. For example, when the wireless signal is a signal with quadrature amplitude modulation (QAM) of 64, when the peak to average power ratio (PAPR) thereof is 3.7 dB, and when the target EVM is 8%, the SNR thereof is 18.2 dB.

Figure 4:
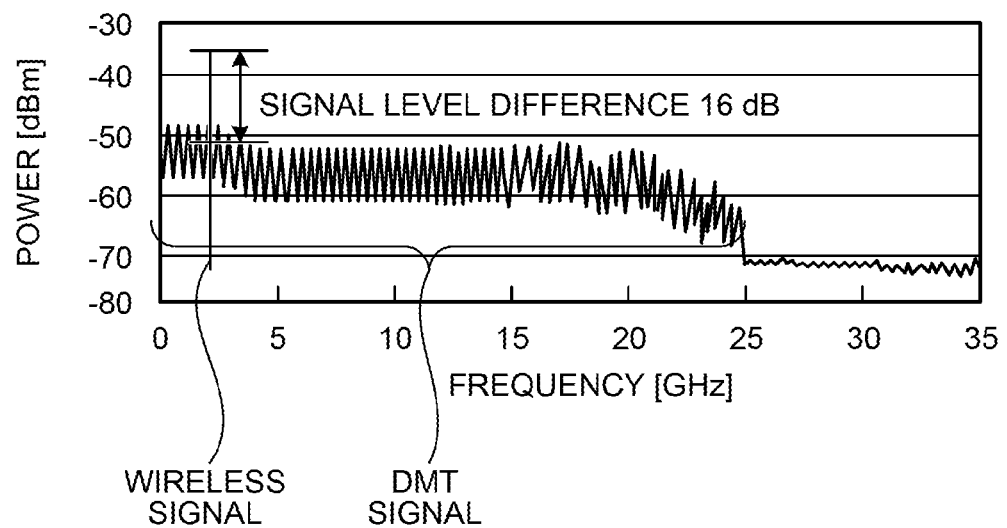
FIG. 4 is a schematic diagram illustrating an example of the frequency spectrum of a wireless signal and a DMT signal.

FIG. 4 is a schematic diagram illustrating an example of the frequency spectrum of a wireless signal and a DMT signal. As illustrated in FIG. 4, the allocating unit 18 calculates a signal level difference that is a difference between the signal level related to the carrier frequency of the wireless signal and the signal level related to the DMT signal of the subject carrier frequency. The signal level difference illustrated in FIG. 4 is 16 dB. The allocating unit 18 calculates a conversion SNR by subtracting the signal level difference from the SNR of the wireless signal of the target EVM. For example, the allocating unit 18 calculates the conversion SNR as the result of 18.2 dB−16 dB=2.2 dB.

Figure 5:
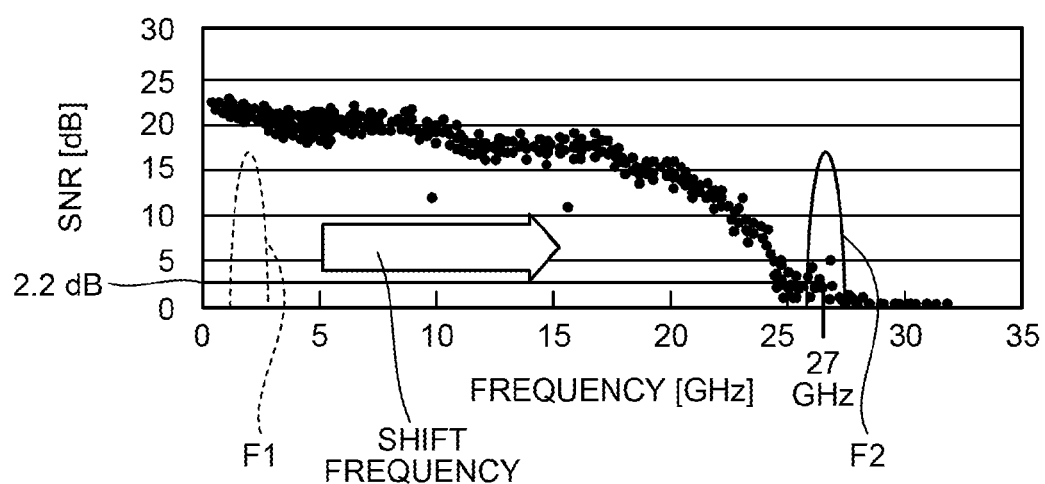
FIG. 5 is a schematic diagram illustrating an example of the probe result (SNR-frequency characteristic) of the DMT signal.
Figure 6:
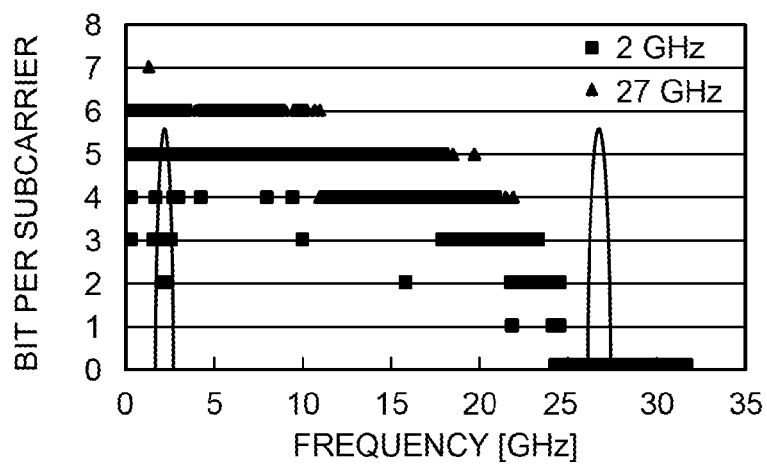
FIG. 6 is a schematic diagram illustrating an example of the number of bits to be allocated for each SC (frequency) in the DMT signal.

FIG. 5 is a schematic diagram illustrating an example of the probe result (SNR-frequency characteristic) of the DMT signal. The allocating unit 18 searches the probe result of the DMT signal illustrated in FIG. 5 for the frequency that is associated with the conversion SNR and determines the frequency of the search result as the shifted carrier frequency of the wireless signal. Furthermore, the probe result of the DMT signal is a transmission characteristic of the DMT signal obtained from the result of transmission of a test signal of a DMT signal by the optical transmitter 10 itself before an operation. Namely, the allocating unit 18 searches the probe result illustrated in FIG. 5 for the frequency of 27 GHz that is associated with the conversion SNR of 2.2 dB and determines the shifted carrier frequency of the wireless signal as 27 GHz. After the allocating unit 18 determines the shifted carrier frequency of the wireless signal, the allocating unit 18 calculates a frequency shift amount between the carrier frequency F1 of the current wireless signal and the shifted carrier frequency F2 and then sets the frequency shift amount in the oscillator 16. FIG. 6 is a schematic diagram illustrating an example of the number of bits to be allocated for each SC (frequency) in the DMT signal. The wireless signal illustrated in FIG. 6 is shifted from the SCs on the low frequency side having a favorable transmission characteristic, in which the number of bits to be allocated to the DMT signal is large, to the SCs on the high frequency side having a transmission characteristic in which the number of bits to be allocated is small. The mixer 15, the oscillator 16, the monitoring unit 17, and the allocating unit 18 correspond to, for example, a shifting unit.

Figure 7:
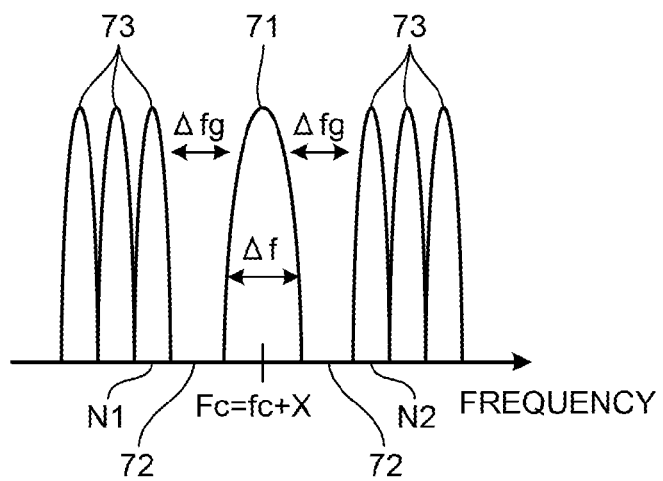
FIG. 7 is a schematic diagram illustrating an example of the SCs in the DMT signal that is obtained by multiplexing a wireless signal.

FIG. 7 is a schematic diagram illustrating an example of the SCs in the DMT signal that is obtained by multiplexing a wireless signal. The DMT signal illustrated in FIG. 7 includes a wireless signal 71, guard bands 72, and information signals 73. The allocating unit 18 acquires, from the monitoring unit 17, the carrier frequency fc and the use band width Δf that are associated with the signaling technique for the wireless signal 71. Furthermore, it is assumed that the use band width of the guard band is Δfg.

As illustrated in FIG. 7, the allocating unit 18 calculates, on the basis of the frequency bands of fc−Δf/2 to fc+Δf/2 of the wireless signal, a guard band on a lower side of fc−Δf/2−Δfg and a guard band on a higher side of fc+Δf/2+Δfg. Namely, the allocating unit 18 calculates the guard band on the lower side and the guard band on the higher side related to the wireless signal of the determined shifted frequency of Fc (=fc+X).

Furthermore, the allocating unit 18 searches the SC numbers on the lower side of the frequency band of f<Fc−Δf/2−Δfg for a maximum SC number N1 that is present, in a direction in which the frequency is decreased, subsequent to the SC numbers on the lower side. The allocating unit 18 searches the SC numbers on the higher side of the frequency band of f>Fc+Δf/2+Δfg for a minimum SC number N2 that is present, in a direction in which the frequency is increased, subsequent to the SC numbers on the higher side.

The allocating unit 18 allocates the information signal of "DMT" to the allocation of the maximum SC number N1 that is present, in a direction in which the frequency is decreased, subsequent to the SC numbers on the lower side and allocates the information signal of "DMT" to the allocation of the minimum SC number N2 that is present, in a direction in which the frequency is increased, subsequent to the SC numbers on the higher side. Furthermore, the allocating unit 18 allocates the wireless signal of "wireless" to the allocation of the SC numbers of the SCs present in the range between the SC that has the SC number N1+1 and that is adjacent, in the direction in which the frequency is increased, to the SC number N1 on the lower side and the SC that has the SC number N2−1 and that is adjacent, in the direction in which the frequency is decreased, to the SC number N2 on the higher side.

The allocating unit 18 updates, on the basis of the allocation content, the allocation information of the SC number 32A in the allocation table 32. The allocating unit 18 refers to the allocation table 32 and sets, in the DMT modulating unit 11, the allocation information, such as the use frequency 32B, the allocation signal 32C, and the like, that are associated with the SC number 32A. The DMT modulating unit 11 generates, on the basis of the allocation information, a DMT signal in which the information signals are allocated to the SCs that do not overlap the carrier frequency of the wireless signal in which the frequency has been shifted. The allocating unit 18 notifies the optical receiver 20 via, for example, a control line 3, of the setting information to which, in addition to the allocation information, frequency information including carrier frequencies of the wireless signals before the shift and after the shift, the use band width, or the like are added.

The optical receiver 20 includes an optical to electrical converting unit (hereinafter, simply referred to as an O/E) 21, a demultiplexing unit 22, a DMT demodulating unit 23, a mixer 24, and an oscillator 25. The O/E 21 performs electric conversion on the optical DMT signal received from the optical transmission line 2 and obtains a DMT signal. On the basis of carrier frequency Fc of the shifted wireless signal and the use band width Δf in the setting information received from the optical transmitter 10, the demultiplexing unit 22 separates the shifted wireless signal and the DMT signal from the DMT signal. The oscillator 25 generates an oscillating frequency that is associated with the carrier frequency before the frequency has not been shifted and that is stored in the setting information received from the allocating unit 18 on the optical transmitter 10 side. Furthermore, the mixer 24 performs frequency conversion on the wireless signal in accordance with the oscillating frequency output from the oscillator 25, restores the wireless signal to the carrier frequency before the frequency has not been shifted, and outputs the wireless signal before the frequency has not been shifted. Furthermore, on the basis of the allocation information received from the allocating unit 18 in the optical transmitter 10, the DMT demodulating unit 23 demodulates the separated DMT signal and outputs the information signals.

Figure 8:
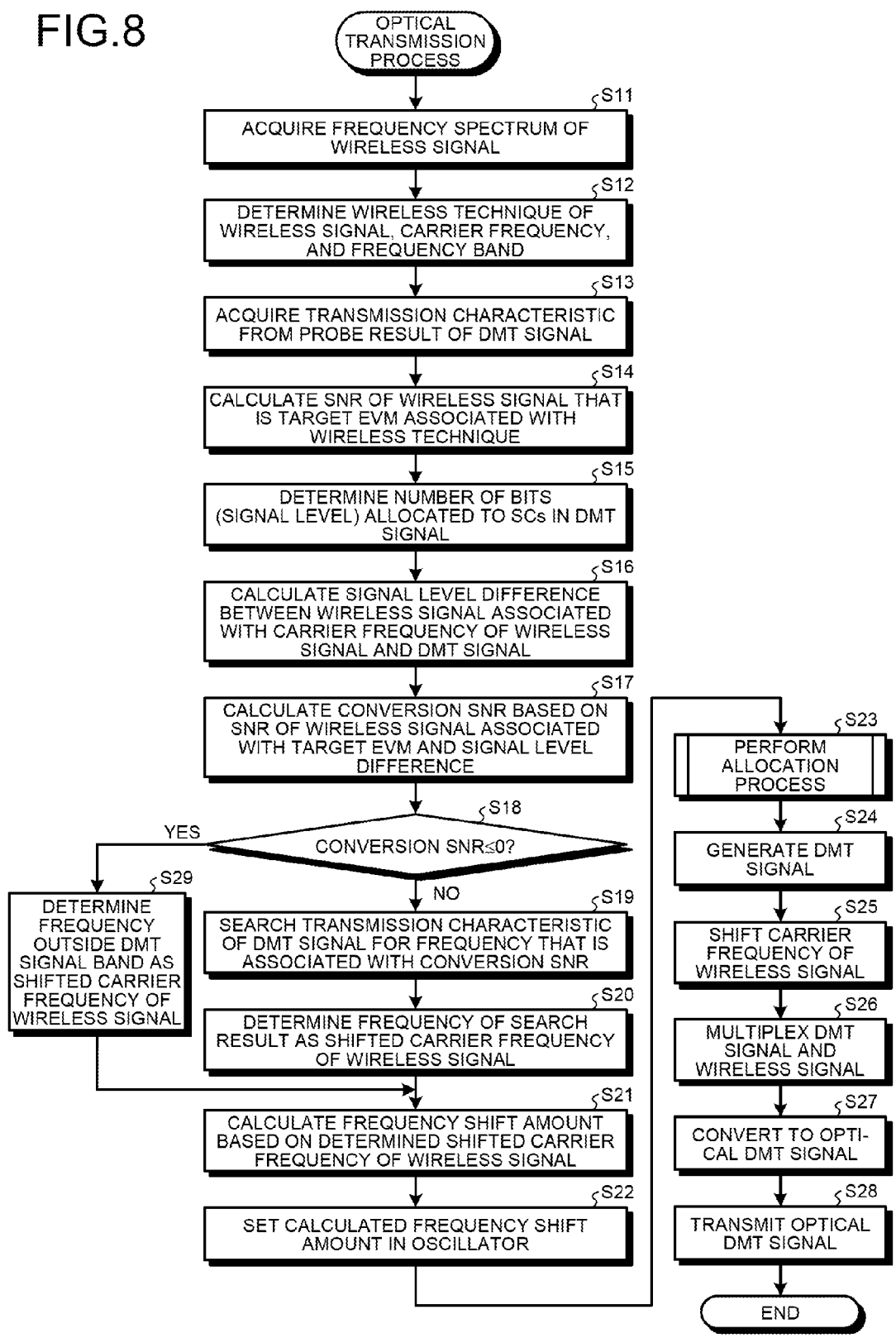
FIG. 8 is a flowchart illustrating an example of an operation of a process performed by an optical transmitter related to an optical transmission process.

In the following, an operation of the optical transmission system 1 according to the first embodiment will be described. FIG. 8 is a flowchart illustrating an example of an operation of a process performed by the optical transmitter 10 related to an optical transmission process. The optical transmission process illustrated in FIG. 8 is a process of shifting the carrier frequency of the wireless signal to the SCs on the high frequency side in the DMT signal, multiplexing the wireless signal into the DMT signal, and transmitting the signal to the optical transmission line 2.

In FIG. 8, the monitoring unit 17 in the optical transmitter 10 acquires, via the spectrum analyzer 17A, a frequency spectrum of the peak frequency or the like of the wireless signal (Step S11). Furthermore, the monitoring unit 17 refers to the wireless technique table 31 and determines, on the basis of the acquired frequency spectrum, a frequency technique, a carrier frequency, and a frequency band of the wireless signal (Step S12). Furthermore, the allocating unit 18 in the optical transmitter 10 acquires, as illustrated in FIG. 5, the transmission characteristic of the DMT signal from the probe result of the DMT signal (Step S13). The allocating unit 18 calculates an SNR of the wireless signal that is associated with the target EVM associated with the wireless technique (Step S14). Furthermore, the allocating unit 18 calculates an SNR of the wireless signal on the basis of SNR (dB)=−[PAPR+20×log$_{10}$(EVM(%))]. The allocating unit 18 acquires a signal level that is associated with the number of bits to be allocated for each frequency (SC) in the DMT signal (Step S15).

The allocating unit 18 subtracts the signal level of the DMT signal associated with the carrier frequency of the wireless signal from the signal level associated with the subject carrier frequency of the wireless signal and calculates a signal level difference therebetween (Step S16). After the allocating unit 18 calculates the signal level difference, the allocating unit 18 subtracts the signal level difference from the SNR of the wireless signal of the target EVM and calculates a conversion SNR (Step S17). The allocating unit 18 determines whether the conversion SNR is equal to or less than 0 (Step S18). When the conversion SNR is not equal to or less than 0 (No at Step S18), the allocating unit 18 searches the transmission characteristic of the DMT signal, i.e., the probe result illustrated in FIG. 5, for the frequency associated with the conversion SNR (Step S19).

The allocating unit 18 determines the frequency of the search result as the shifted carrier frequency of the wireless signal (Step S20). The allocating unit 18 calculates, on the basis of the determined shifted carrier frequency of the wireless signal, a frequency shift amount from the current carrier frequency to the shifted carrier frequency of the wireless signal (Step S21). The allocating unit 18 sets the calculated frequency shift amount in the oscillator 16 (Step S22). Then, the allocating unit 18 performs an allocation process illustrated in FIG. 9, which will be described later (Step S23).

Furthermore, after performing the allocation process, the DMT modulating unit 11 generates a DMT signal on the basis of the allocation information in the setting information (Step S24). The mixer 15 performs frequency conversion on the wireless signal in accordance with the oscillating frequency having the frequency shift amount from the oscillator 16 and then shifts the carrier frequency of the wireless signal (Step S25). Consequently, the wireless signal is shifted to the carrier frequency determined at Step S20 or Step S29. The multiplexing unit 12 multiplexes the wireless signal received from the mixer 15 into the DMT signal received from the DMT modulating unit 11 (Step S26). Furthermore, the E/O 13 converts the multiplexed DMT signal to an optical DMT signal (Step S27), transmits the optical DMT signal to the optical transmission line 2 (Step S28), and ends the operation of the process illustrated in FIG. 8. Furthermore, the optical DMT signal is the optical signal that is obtained by shifting the carrier frequency of the wireless signal to the SCs on the high frequency side in the DMT signal and multiplexing the wireless signal into the DMT signal. For the DMT signal, the carrier frequency of the wireless signal does not overlap the SCs on the low frequency side, which means that the subject transmission characteristic has been improved.

Furthermore, when the conversion SNR is equal to or less than 0 (Yes at Step S18), the allocating unit 18 determines the frequency outside the DMT signal band as the shifted carrier frequency of the wireless signal (Step S29). The frequency outside the DMT signal band mentioned here is, for example, the frequency band on the high frequency side or the frequency band on the low frequency side that is not used by the DMT signal. Then, the allocating unit 18 proceeds to Step S21 in order to calculate a frequency shift amount on the basis of the shifted carrier frequency of the determined wireless signal.

When the conversion SNR is not equal to or less than 0, the optical transmission process illustrated in FIG. 8 searches the transmission characteristic of the DMT signal for the frequency associated with the conversion SNR, determines the frequency as the shifted carrier frequency of the wireless signal, and sets the wireless signal to the SCs on the high frequency side in the DMT signal. Consequently, because the wireless signal does not overlap the SCs on the low frequency side in the DMT signal, the transmission characteristic of the DMT signal can be improved.

When the conversion SNR is equal to or less than 0, the optical transmission process determines the frequencies that are other than the use band of the DMT signal and that are not used as the carrier frequencies of the wireless signal and sets the wireless signal to the band other than the use band of the DMT signal. Consequently, the wireless signal does not overlap the use band of the DMT signal, the transmission characteristic of the DMT signal can be improved.

Figure 9:
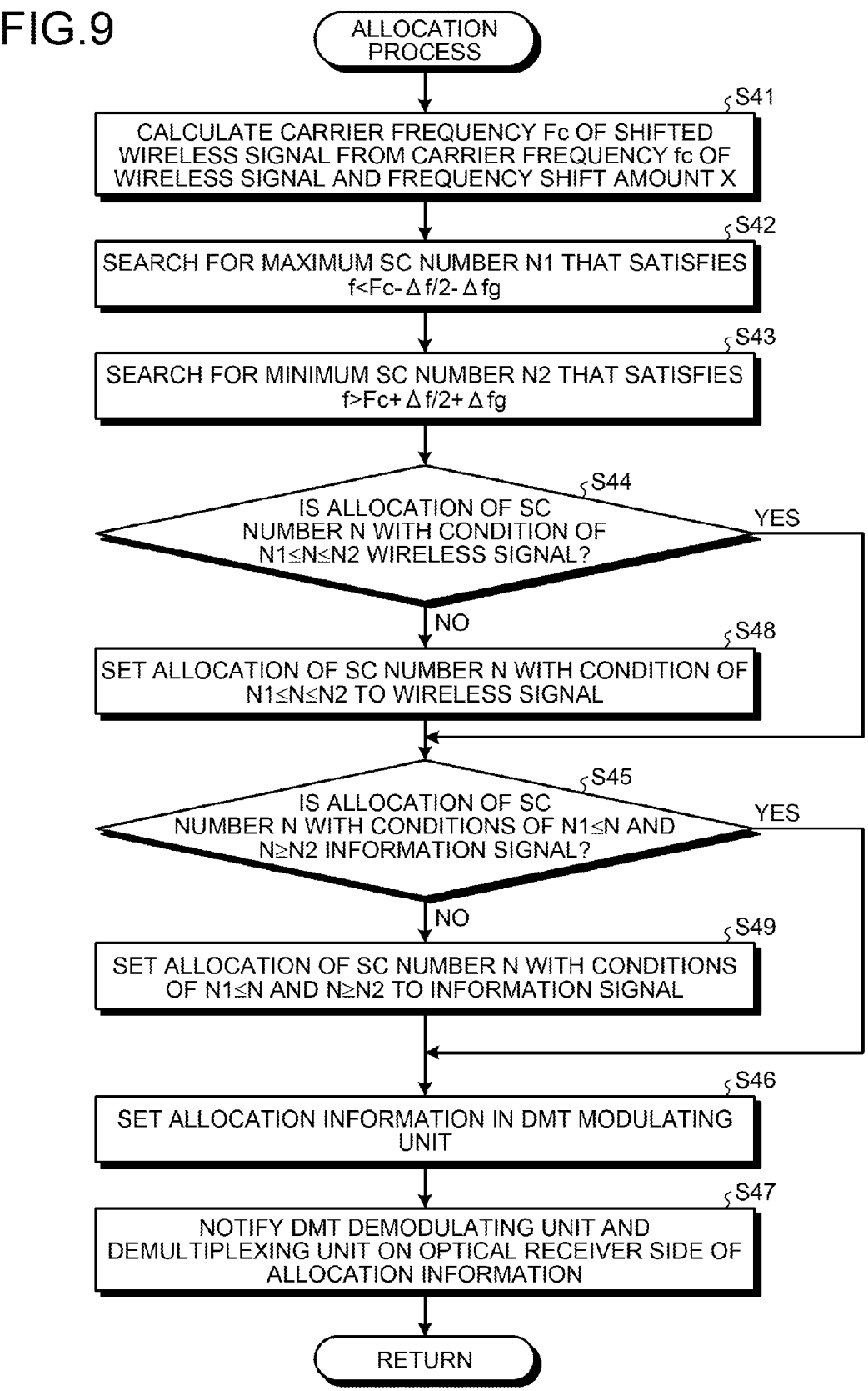
FIG. 9 is a flowchart illustrating an example of an operation of a process performed by an allocating unit on the optical transmitter side related to an allocation process.

FIG. 9 is a flowchart illustrating an example of an operation of a process performed by the allocating unit 18 on the optical transmitter 10 side related to an allocation process. The allocation process illustrated in FIG. 9 is a process of setting the allocation of the wireless signal and the information signal of the SC in the DMT signal so as not to overlap the shifted carrier frequency of the determined wireless signal.

In FIG. 9, on the basis of the carrier frequency fc of the wireless signal acquired by the monitoring unit 17 and on the basis of the calculated frequency shift amount X, the allocating unit 18 calculates a carrier frequency Fc of the shifted wireless signal (Step S41). The allocating unit 18 searches the SCs in the DMT signal for the maximum SC number N1 that satisfies the condition of f<Fc−Δf/2−Δfg (Step S42). Furthermore, the maximum SC number N1 is the SC that is adjacent to the carrier frequency of the shifted wireless signal and that is present in the DMT signal in a direction in which the frequency is decreased. The allocating unit 18 searches the SCs in the DMT signal for the minimum SC number N2 that satisfies the condition of f>Fc+Δf/2+Δfg (Step S43). Furthermore, the minimum SC number N2 is the SC that is adjacent to the carrier frequency of the shifted wireless signal and that is present in the DMT signal in a direction in which the frequency is increased.

The allocating unit 18 refers to the allocation table 32 and determines whether the allocation of the SC number N with the condition of N1≤N≤N2 is a wireless signal (Step S44). When the allocation of the SC number N is a wireless signal (Yes at Step S44), the allocating unit 18 refers to the allocation table 32 and determines whether the allocation of the SC number N with the conditions of N1≤N and N≤N2 is an information signal (Step S45).

When the allocation of the SC number N is an information signal (Yes at Step S45), the allocating unit 18 sets, in the DMT modulating unit 11, the allocation information including the allocation content for each SC number (Step S46). After the allocating unit 18 sets the allocation information in the DMT modulating unit 11, the allocating unit 18 notifies the DMT demodulating unit 23 and the demultiplexing unit 22 on the optical receiver 20 side of the allocation information (Step S47) and ends the operation of the process illustrated in FIG. 9. Furthermore, when the allocation of the SC number N with the condition of N1≤N≤N2 is not a wireless signal (No at Step S44), the allocating unit 18 sets the allocation of the SC number N to the wireless signal and updates the content of the allocation table 32 (Step S48). Then, the allocating unit 18 proceeds to Step S45 in order to determine whether the allocation of the SC number N is an information signal.

When the allocation of the SC number N with the conditions of N1≤N and N≤N2 is not an information signal (No at Step S45), the allocating unit 18 sets the allocation of the SC number N with the conditions of N1≤N and N≥N2 to the information signal (DMT) and updates the content of the allocation table 32 (Step S49). Then, the allocating unit 18 proceeds to Step S46 in order to set the setting information in the DMT modulating unit 11.

In the allocation process illustrated in FIG. 9, after the carrier frequency of the shifted wireless signal is determined, the SCs associated with the shifted carrier frequency of the wireless signal in the DMT signal are allocated to a wireless signal. Furthermore, the SCs other than the SCs associated with the shifted carrier frequency of the wireless signal in the DMT signal are allocated to the information signal (DMT). Consequently, the information signal in the DMT signal does not overlap the wireless signal and thus the degradation of the transmission characteristic of the DMT signals and the wireless signals can be suppressed. Namely, the optical transmitter 10 efficiently transmits the wireless signals by using the optical DMT signals.

Figure 10:
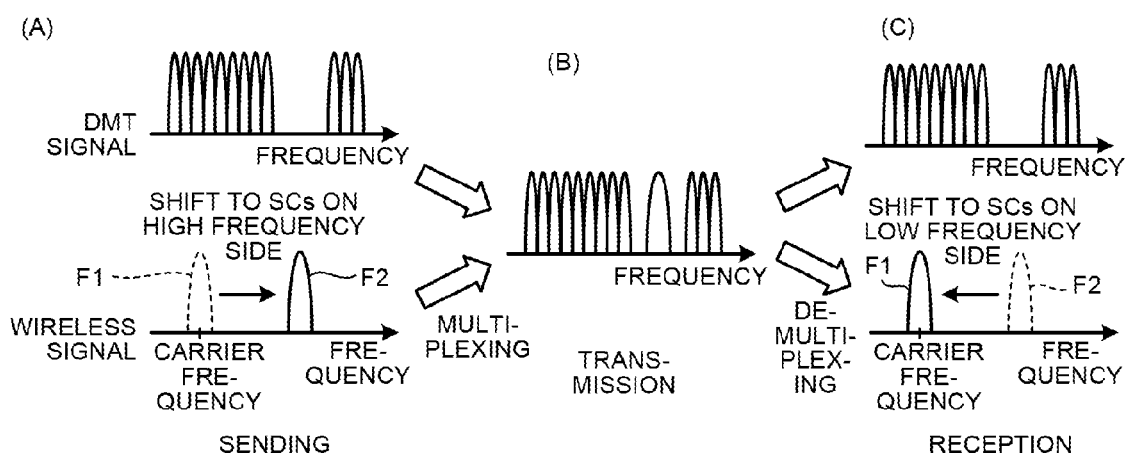
FIG. 10 is a schematic diagram illustrating an example of an operation of multiplexing and demultiplexing related to the DMT signal.

FIG. 10 is a schematic diagram illustrating an example of an operation of multiplexing and demultiplexing related to the DMT signal. As indicated by (A) illustrated in FIG. 10, the mixer 15 in the optical transmitter 10 shifts the carrier frequency of the wireless signal to the SCs on the high frequency side in the DMT signal. Furthermore, the DMT modulating unit 11 in the optical transmitter 10 generates, on the basis of the allocation information, a DMT signal in which the information signals are allocated to the SCs such that the information signals are not allocated to the SCs that are associated with the shifted carrier frequency of the wireless signal. Namely, because the DMT modulating unit 11 has shifted the wireless signal to the high frequency side, the information signals can be allocated to the SCs on the low frequency in which the transmission characteristic is favorable. Then, the multiplexing unit 12 in the optical transmitter 10 multiplexes the wireless signal received from the mixer 15 into the DMT signal received from the DMT modulating unit 11 and transmits, as indicated by (B) illustrated in FIG. 10, the optical DMT signal to the optical receiver 20. Consequently, because the wireless signal does not overlap the information signals allocated to the SCs on the low frequency side in the DMT signal in which the transmission characteristic is favorable, the transmission characteristic of the DMT signal can be improved.

Furthermore, when the demultiplexing unit 22 on the optical receiver 20 side receives an optical DMT signal, as indicated by (C) illustrated in FIG. 10, the demultiplexing unit 22 separates the DMT signal and the wireless signal from the optical DMT signal. The DMT demodulating unit 23 on the optical receiver 20 side modulates the DMT signal and outputs the information signal. Furthermore, the mixer 24 on the optical receiver 20 side can restore, on the basis of the frequency information, the wireless signal that is input from the demultiplexing unit 22 to the carrier frequency of the SCs on the low frequency before the shift is performed and output the wireless signal of the carrier frequency before the frequency has not been shifted. Consequently, the optical receiver 20 can acquire not only the information signal but also the wireless signal from the optical DMT signal received from the optical transmitter 10.

The optical transmitter 10 according to the first embodiment shifts the carrier frequency of the wireless signal to the SCs on the high frequency side in the DMT signal such that the information signal and the wireless signal in the DMT signal do not overlap the SCs on the low frequency side, multiplexes the wireless signal into the DMT signal, and then transmits the signal to the optical transmission line 2. Consequently, because the information signal and the wireless signal in the DMT signal do not overlap the SCs on the low frequency side, the transmission characteristic of the subject DMT signal can be improved.

The optical transmitter 10 calculates a conversion SNR by subtracting the signal level difference between the wireless signal and the DMT signal from the SNR of the wireless signal that satisfies the target EVM and then searches the probe result of the DMT signal for the frequency corresponding to the conversion SNR. Furthermore, the optical transmitter 10 determines the frequency of the search result as the shifted carrier frequency of the wireless signal. Consequently, the shifted carrier frequency that satisfies the target EVM of the wireless signal can be acquired.

Furthermore, the allocating unit 18 according to the first embodiment described above calculates a signal level difference between the signal level of the carrier frequency of the wireless signal and the signal level of the DMT signal associated with the carrier frequency of the wireless signal and calculates a conversion SNR on the basis of the calculated signal level difference and the SNR of the wireless signal of the target EVM. However, when the signal level difference is small, the frequency shift amount is also small and thus the improvement effect of the transmission characteristic of the DMT signal is also small. Accordingly, an embodiment of this case will be described below as a second embodiment.

[b] Second Embodiment

Figure 11:
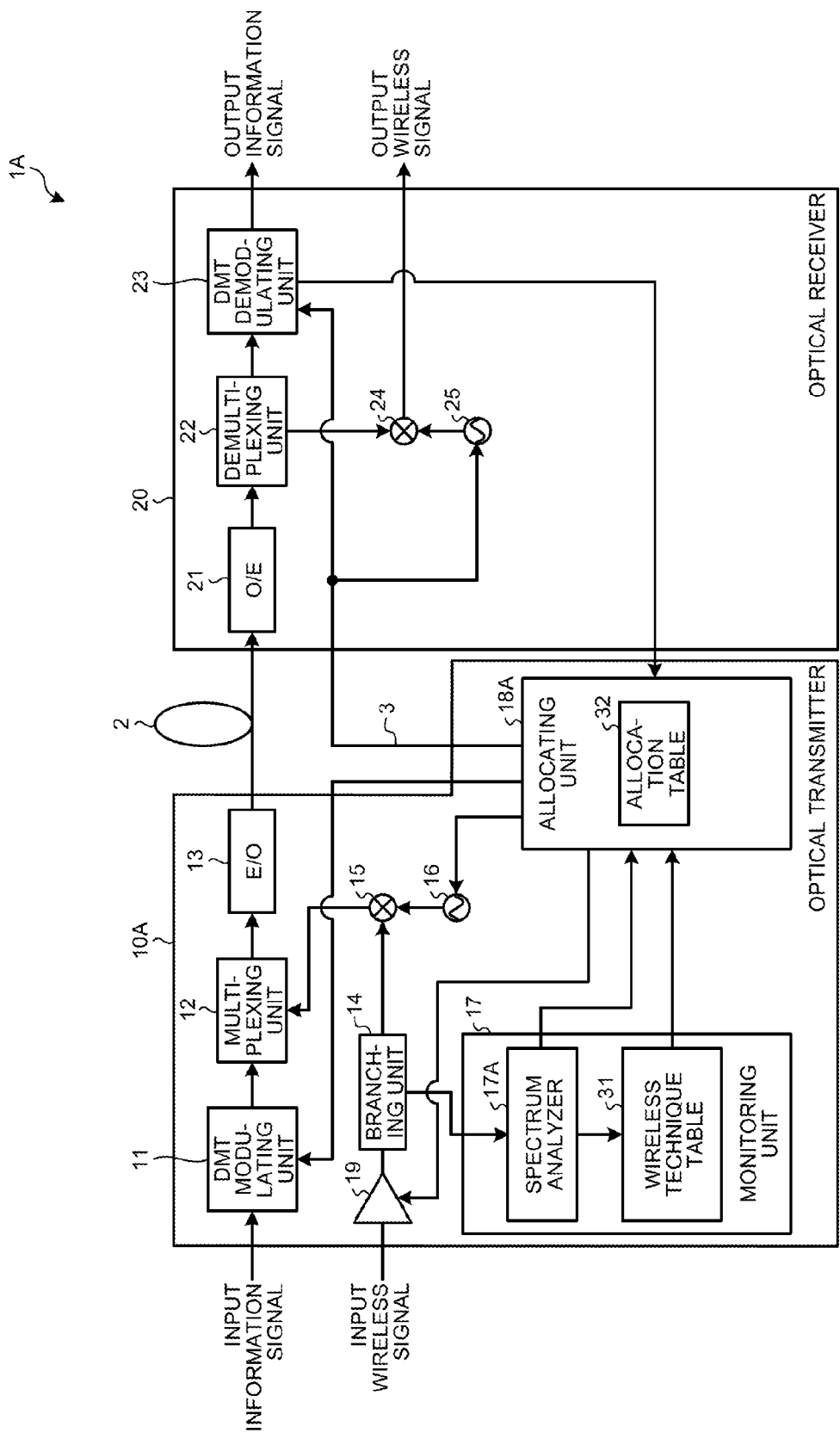
FIG. 11 is a block diagram illustrating an example of an optical transmission system according to a second embodiment.

FIG. 11 is a block diagram illustrating an example of an optical transmission system 1A according to a second embodiment. By assigning the same reference numerals to components having the same configuration as those in the optical transmission system 1 according to the first embodiment, descriptions thereof will be omitted.

The optical transmission system 1A illustrated in FIG. 11 differs from the optical transmission system 1 illustrated in FIG. 1 in that an amplifier 19 is disposed upstream of the branching unit 14 in an optical transmitter 10A and, when the signal level difference is less than a predetermined threshold, the level of the wireless signal is amplified by the amplifier 19 and the signal is input to the branching unit 14. The amplifier 19 corresponds to, for example, an adjustment unit.

An allocating unit 18A determines whether the signal level difference between the signal level of the carrier frequency of the wireless signal and the signal level of the DMT signal is less than the predetermined threshold. When the signal level difference is less than the predetermined threshold, the allocating unit 18A requests the amplifier 19 to amplify the signal level of the wireless signal.

The amplifier 19 amplifies, in accordance with the amplification request from the allocating unit 18A, the signal level of the input wireless signal and then inputs the amplified wireless signal to the branching unit 14. Then, the monitoring unit 17 acquires the frequency spectrum of the wireless signal via the spectrum analyzer 17A. At this time, the monitoring unit 17 acquires the signal level of the wireless signal amplified by the amplifier 19.

Because the signal level of the carrier frequency of the wireless signal is amplified, the allocating unit 18A can secures a signal level difference equal to or greater than a predetermined threshold as the difference between the signal level of the wireless signal and the signal level of the DMT signal.

Figure 12:
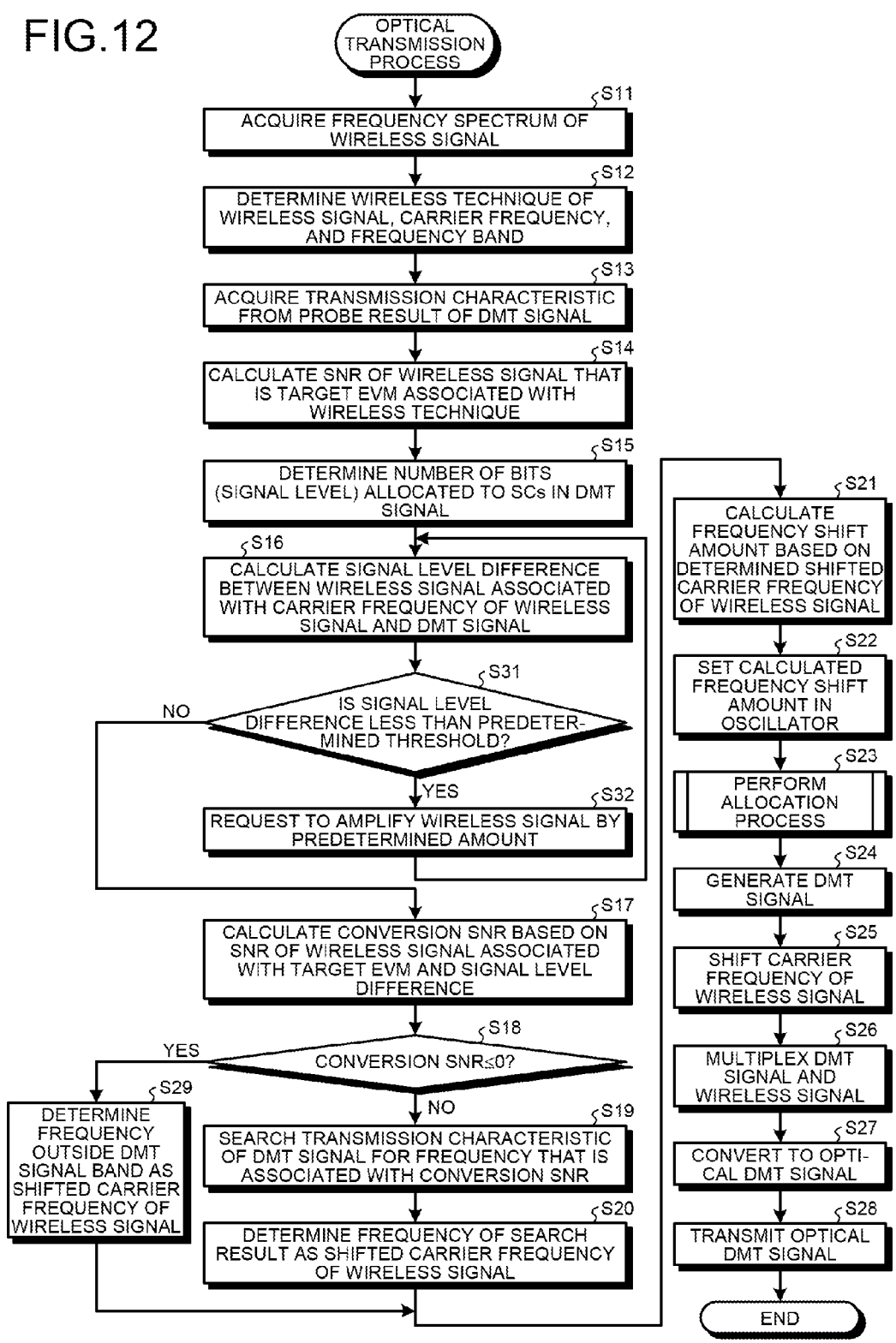
FIG. 12 is a flowchart illustrating an example of an operation of a process performed by an optical transmitter related to the optical transmission process.

In the following, an operation of the optical transmission system 1A according to the second embodiment will be described. FIG. 12 is a flowchart illustrating an example of an operation of a process performed by the optical transmitter 10A related to the optical transmission process. In FIG. 12, the allocating unit 18A calculates the signal level difference at Step S16. The allocating unit 18A determines whether the signal level difference is less than the predetermined threshold (Step S31). When the signal level difference is less than the predetermined threshold (Yes at Step S31), the allocating unit 18A requests the amplifier 19 to amplify the wireless signal by a predetermined amount (Step S32). Consequently, the amplifier 19 amplifies the signal level of the wireless signal in accordance with the amplification request from the allocating unit 18A.

Furthermore, after the allocating unit 18A requests the amplification by the predetermined amount, the allocating unit 18A proceeds to Step S16 in order to calculate a signal level difference between the wireless signal that is associated with the carrier frequency of the wireless signal and the DMT signal. Consequently, the signal level difference between the wireless signal and the DMT signal becomes large by an amount corresponding to the amplified signal level of the wireless signal.

Furthermore, when the signal level difference is not less than the predetermined threshold (No at Step S31), the allocating unit 18A proceeds to Step S17 in order to calculate a conversion SNR of the wireless signal on the basis of the SNR of the wireless signal of the target EVM and the signal level difference.

The optical transmission process illustrated in FIG. 12 amplifies, when the signal level difference between the wireless signal and the DMT signal is less than the predetermined threshold, the wireless signal and again calculates a signal level difference between the wireless signal and the DMT signal. Consequently, it is possible to secure the signal level difference having a value equal to or greater than the predetermined threshold and secure the conversion SNR that is used when the carrier frequency of the wireless signal is shifted.

When the signal level difference between the wireless signal and the DMT signal is less than the predetermined threshold, the optical transmission system 1A according to the second embodiment amplifies the wireless signal and again calculates a signal level difference between the wireless signal and DMT signal. Consequently, it is possible to secure the signal level difference having the value equal to or greater than the predetermined threshold and acquire the conversion SNR that is used when the carrier frequency of the wireless signal is shifted.

When the conversion SNR is not equal to or less than 0, the optical transmitter 10A searches the transmission characteristic of the DMT signal for the frequency associated with the subject conversion SNR, determines the frequency as the carrier frequency of the shifted wireless signal, and sets the wireless signal to the SCs on the high frequency side in the DMT signal. Consequently, because the wireless signal does not overlap the SCs on the low frequency side in the DMT signal, the transmission characteristic of the DMT signal can be improved.

When the conversion SNR is equal to or less than 0, the optical transmitter 10A determines, as the carrier frequency of the wireless signal, the frequency that is other than the use band of the DMT signal and that has not been used and sets the wireless signal to the band other than the use band of the DMT signal. Consequently, because the wireless signal does not overlap the use band of the DMT signal, the transmission characteristic of the DMT signal can be improved.

Furthermore, in the first and the second embodiments described above, for convenience of explanation, the optical transmission system 1 (1A) constituted by the optical transmitter 10 (10A) and the optical receiver 20 has been described; however, the optical transmitter 10 (10A) and the optical receiver 20 may also be embedded in a single transmission device. The embodiment according to this case will be described below as a third embodiment.

[c] Third Embodiment

Figure 13:
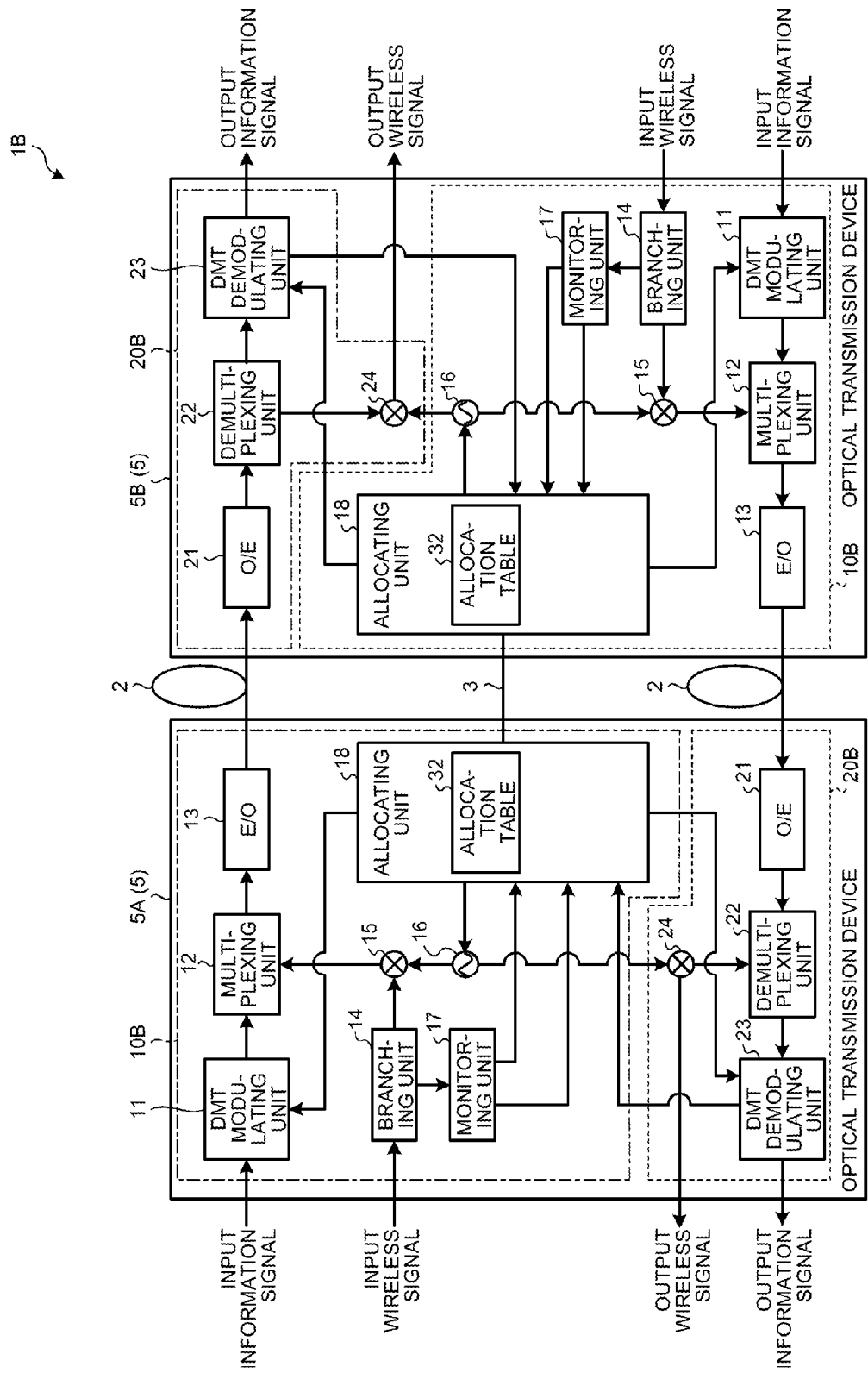
FIG. 13 is a block diagram illustrating an example of an optical transmission system according to a third embodiment.

FIG. 13 is a block diagram illustrating an example of an optical transmission system 1B according to a third embodiment. By assigning the same reference numerals to components having the same configuration as those in the optical transmission system 1 according to the first embodiment, descriptions thereof will be omitted.

The optical transmission system 1B illustrated in FIG. 13 includes an optical transmission device 5A (5) and an optical transmission device 5B (5) that is disposed on the opposite side and is configured such that the optical transmission device 5A and the optical transmission device 5B that is disposed on the opposite side are connected by the optical transmission line 2. Furthermore, the optical transmission device 5B on the opposite side has the same configuration as that of the optical transmission device 5A; therefore, by assigning the same reference numerals to components having the same configuration, descriptions thereof will be omitted.

The transmission device 5 includes an optical transmitter 10B and an optical receiver 20B. The optical transmitter 10B includes the DMT modulating unit 11, the multiplexing unit 12, the E/O 13, the branching unit 14, the mixer 15, the oscillator 16, the monitoring unit 17, and the allocating unit 18. The optical receiver 20B includes the O/E 21, the demultiplexing unit 22, the DMT demodulating unit 23, and the mixer 24. Furthermore, the oscillator on the optical receiver 20B shares the oscillator 16 in the optical transmitter 10B.

The optical transmission device 5A transmits, by using the optical transmission line 2 between the optical transmission device 5B disposed on the opposite side, an optical DMT signal that is obtained by multiplexing the DMT signal into the wireless signal.

Because the transmission devices 5 (5A and 5B) according to the third embodiment include therein the optical transmitter 10B and the optical receiver 20B and, furthermore, the oscillator 16 is shared by the optical transmitter 10B and the optical receiver 20B, the number of components can be reduced.

In the first to the third embodiments, a case in which the allocating unit 18 is embedded in the optical transmitter 10 (10A and 10B) has been described as an example; however, the allocating unit 18 may also be embedded in the optical receiver 20 (20B) or may also be embedded in a management device other than the optical transmitter 10 and the optical receiver 20.

Furthermore, a description has been given of a case in which the allocating unit 18 shifts the carrier frequency of the wireless signal that is multiplexed into the DMT signal to the SC on the high frequency side in the DMT signal; however, the band that is not used by the SC in the DMT signal may be used. For example, the carrier frequency of the wireless signal may also be shifted to the frequency associated with a free SC in the DMT signal such that the information signal and wireless signal in the DMT signal do not overlap.

Furthermore, the allocating unit 18 includes therein the allocation table 32 that manages the allocation content for each SC in the DMT signal. However, instead of preparing the allocation table 32, the allocation content of the SC in the DMT signal may be detected each time and the allocation process may also be performed.

In the first to the third embodiments described above, the setting information is notified from the optical transmitter 10 to the optical receiver 20 via the control line 3 that is different from the optical transmission line 2. However, for example, the allocation information may also be included in a control signal, for example, an optical service channel (OSC) signal, of the multicarrier signal transmitted in the optical transmission line 2 and then sent as a notification from the optical transmitter 10 to the optical receiver 20.

In the first to the third embodiments described above, electrical to optical conversion is performed after electrically multiplexing the wireless signal into the DMT signal; however, after performing electrical to optical conversion on the DMT signal and the wireless signal, optical frequency multiplexing may also be performed on the DMT signal and the wireless signal that have been subjected to the electrical to optical conversion. Consequently, this method is effective in signal processing using the high frequency band when compared with a case in which multiplexing (frequency multiplexing) is performed by using an electrical signal.

Furthermore, in the embodiments described above, the optical transmitter 10 that uses the DMT modulation technique is described as an example; however, the embodiment may also be applied to an optical transmitter that uses another multicarrier modulation technique that allocates information signals to multiple SCs and that modulates each of the information signals allocated to each of the SCs. For example, the embodiment may also be applied to an optical transmitter that uses the multicarrier modulation technique, such as various kinds PSK modulation techniques including the Orthogonal Frequency Division Multiplexing (OFDM) modulation technique or the Quadrature Phase Shift Keying (QPSK) modulation technique. Similarly, the embodiment may also be applied to the differential phase shift keying (DPSK), 8-PSK, or the like.

Furthermore, the components of each unit illustrated in the drawings are not always physically configured as illustrated in the drawings. In other words, the specific shape of a separate or integrated unit is not limited to the drawings; however, all or part of the unit can be configured by functionally or physically separating or integrating any of the units depending on various loads or use conditions.

Furthermore, all or any part of various kinds of processing functions performed by each unit may also be executed by a central processing unit (CPU), a digital Signal processor (DSP), a field programmable gate array (FPGA), or the like. Furthermore, all or any part of the various kinds of processing functions may also be executed by programs analyzed and executed by the CPU and the like or executed by hardware by wired logic.

The area in which various kinds of information is stored is, for example, a read only memory (ROM) or a random access memory (RAM), such as a synchronous dynamic random access memory (SDRAM), a magnetoresistive random access memory (MRAM), a non volatile memory (NVRAM), or the like.

Figure 14:
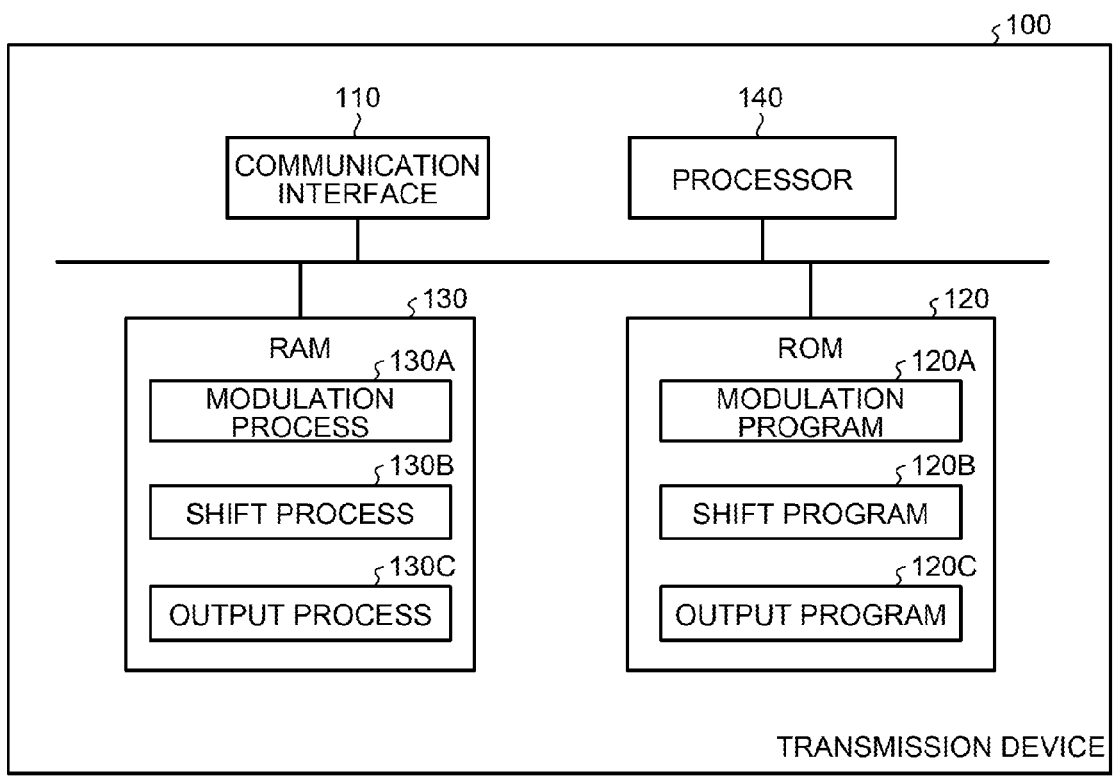
FIG. 14 is a schematic diagram illustrating a transmission device that executes a transmission program.
Figure 15A:
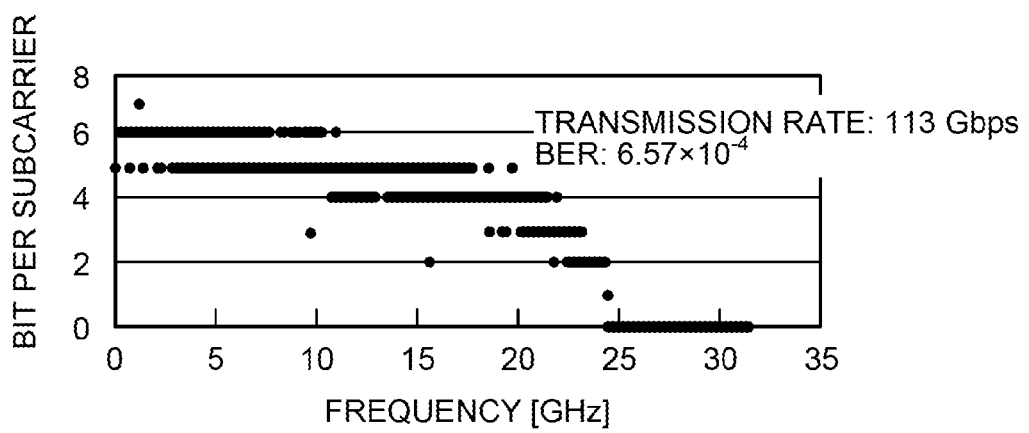
FIG. 15A and FIG.15B are a schematic diagram illustrating an example of the number of bits to be allocated for each SC (frequency) in a DMT signal.
Figure 15B:
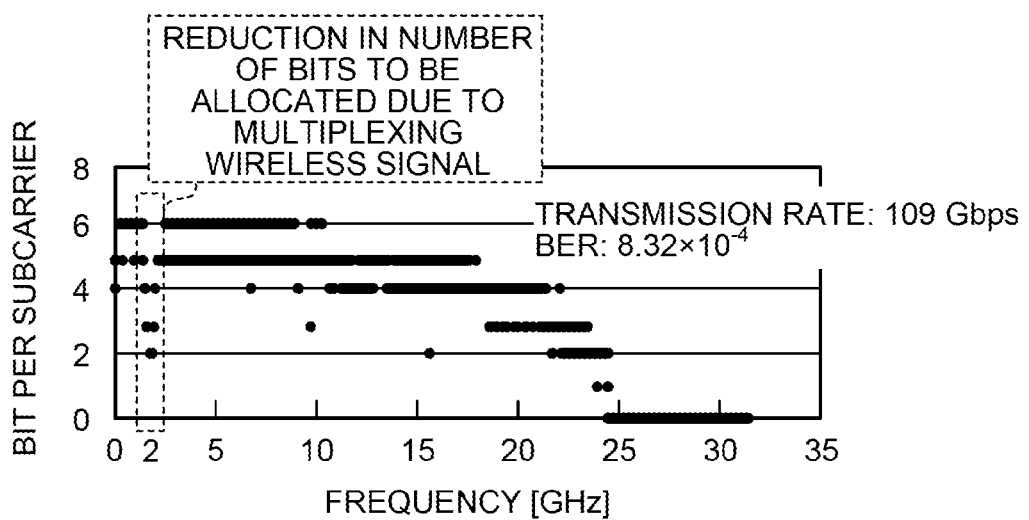

The various processes described in the embodiments can be implemented by a program prepared in advance and executed by an optical module. Accordingly, in the following, an example of a transmission device, such as the optical module, that executes a program having the same function as that performed in the embodiments described above. FIG. 14 is a schematic diagram illustrating a transmission device 100 that executes a transmission program.

In FIG. 14, a transmission device 100 that executes a transmission program includes a communication interface 110, a ROM 120, a RAM 130, and a processor 140.

The ROM 120 stores therein, in advance, a transmission program having the same function as that performed in the embodiments described above. Furthermore, instead of the ROM 120, the transmission program may also be stored in a recording medium that can be read by a drive (not illustrated). Furthermore, the recording medium may also be, for example, a portable recording medium, such as a CD-ROM, a DVD disk, a USB memory, an SD card, or the like, or a semiconductor memory, such as a flash memory, or the like. Furthermore, the transmission program may also be acquired from a storage device that can be communicated via a network. As illustrated in FIG. 14, a modulation program 120A, a shift program 120B, and an output program 120C are used as the transmission program. Furthermore, the programs 120A, 120B, and 120C may also appropriately be integrated or separated.

Then, the processor 140 reads the programs 120A, 120B, and 120C from the ROM 120 and executes each of the read programs on the RAM 130. Then, the processor 140 allows the programs 120A, 120B, and 120C to function, on the RAM 130, as a modulation process 130A, a shift process 130B, and an output process 130C, respectively.

The processor 140 allocates information signals to a plurality of subcarriers, modulates each of the information signals allocated to each of the subcarriers, and generates a first signal. The processor 140 shifts, on the basis of the transmission characteristic information on the first signal and the frequency information on an input second signal, the carrier frequency of a second signal so as not to overlap the subcarriers to which the information signals in the first signal are allocated. The processor 140 multiplexes the first signal and the shifted second signal and outputs the multiplexed signal. Consequently, even when the first signal is multiplexed into the second signal, the transmission characteristic of the first signal can be improved.

According an aspect of an embodiment, an advantage is provided in that the transmission characteristic of the first signal can be improved even when the first signal is multiplexed into the second signal.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising a processor, wherein the processor executes a process comprising:
   allocating an information signal from among a plurality of information signals to a subcarrier in a plurality of subcarriers;
   generating a first signal by modulating each of the information signals allocated to each of the subcarriers;
   receiving a second signal;
   first acquiring first information on the first signal and second information on the second signal, the first information including a transmission characteristic of a frequency in a plurality of frequencies in the first signal and a signal level associated with the frequency, the second information including a carrier frequency of the second signal;
   subtracting a first signal level of the first signal associated with the carrier frequency of the second signal from a second signal level of the second signal associated with the carrier frequency of the second signal;
   second acquiring a signal level difference between the first signal level and the second signal level;
   third acquiring a conversion signal level by subtracting the signal level difference from a target signal level of the second signal, the target signal level corresponding to a signal level tailored to a counterpart device;
   searching a target frequency corresponding to the conversion signal level from the transmission characteristic;
   shifting the carrier frequency of the second signal to the target frequency searched by the searching, so that the subcarrier to which the information signal is allocated is different from the carrier frequency;
   multiplexing the first signal and the second signal shifted by the shifting; and
   outputting the multiplexed signal.

2. The transmission device according to claim 1, wherein the shifting includes shifting the carrier frequency of the second signal to the target frequency that is associated with the subcarriers on a high frequency side.

3. The transmission device according to claim 1, wherein the shifting includes shifting the carrier frequency of the second signal to the target frequency that is associated with a free subcarrier in the plurality of subcarriers in the first signal.

4. The transmission device according to claim 1, wherein the shifting includes shifting the carrier frequency of the second signal to the target frequency of subcarrier other than the subcarriers in the first signal.

5. The transmission device according to claim 1, wherein the subtracting includes adjusting, when determining the signal level difference is less than a predetermined threshold, the second signal level of the second signal.

6. The transmission device according to claim 1, wherein the multiplexing includes allocating the shifted carrier frequency of the second signal to the subcarrier of the target frequency to multiplex the first signal and the second signal shifted by the shifting.

7. A transmitter comprising a processor, wherein the processor executes a process comprising:
   allocating an information signal from among a plurality of information signals to a subcarrier in a plurality of subcarriers;
   generating a first signal by modulating each of the information signals allocated to each of the subcarriers;
   receiving a second signal;
   first acquiring first information on the first signal and second information on the second signal, the first information including a transmission characteristic of a frequency in a plurality of frequencies in the first signal and a signal level associated with the frequency, the second information including a carrier frequency of the second signal;
   subtracting a first signal level of the first signal associated with the carrier frequency of the second signal from a second signal level of the second signal associated with the carrier frequency of the second signal;
   second acquiring a signal level difference between the first signal level and the second signal level;
   third acquiring a conversion signal level by subtracting the signal level difference from a target signal level of the second signal, the target signal level corresponding to a signal level tailored to a counterpart device;
   searching a target frequency corresponding to the conversion signal level from the transmission characteristic;
   shifting the carrier frequency of the second signal to the target frequency searched by the searching, so that the subcarrier to which the information signal is allocated is different from the carrier frequency;
   multiplexing the first signal and the second signal shifted by the shifting; and
   outputting the multiplexed signal.

8. A transmission method that causes a transmission device to perform a process comprising:
   allocating, by a processor of the transmission device, an information signal from among a plurality of information signals to a subcarrier in a plurality of subcarriers;
   generating, by the processor, a first signal by modulating each of the information signals allocated to each of the subcarriers;
   receiving a second signal;
   first acquiring, by the processor, first information on the first signal and second information on the second signal, the first information including a transmission characteristic of a frequency in a plurality of frequencies in the first signal and a signal level associated with the frequency, the second information including a carrier frequency of the second signal;
   subtracting, by the processor, a first signal level of the first signal associated with the carrier frequency of the second signal from a second signal level of the second signal associated with the carrier frequency of the second signal;
   second acquiring, by the processor, a signal level difference between the first signal level and the second signal level;
   third acquiring, by the processor, a conversion signal level by subtracting the signal level difference from a target signal level of the second signal, the target signal level corresponding to a signal level tailored to a counterpart device;

searching, by the processor, a target frequency corresponding to the conversion signal level from the transmission characteristic;

shifting, by the processor, the carrier frequency of the second signal to the target frequency searched by the searching, so that the subcarrier to which the information signal is allocated is different from the carrier frequency;

multiplexing, by the processor, the first signal and the shifted second signal; and outputting, by the processor, the multiplexed signal.

* * * * *